United States Patent
Zhang et al.

(10) Patent No.: US 10,665,893 B2
(45) Date of Patent: May 26, 2020

(54) ANODE MATERIAL INCLUDING GRAPHITE PHASE CARBON MATERIAL AND FUNCTIONALIZED GRAPHENE, METHOD THEREOF, AND LITHIUM ION BATTERY

(71) Applicant: Linde Zhang, Shenzhen (CN)

(72) Inventors: Mingdong Zhang, Shenzhen (CN); Chao Hu, Shenzhen (CN); Linde Zhang, Shenzhen (CN)

(73) Assignee: Linde Zhang, Shenzhen (CN)

( * ) Notice: Subject to any disclaimer, the term of this patent is extended or adjusted under 35 U.S.C. 154(b) by 173 days.

(21) Appl. No.: 15/744,861

(22) PCT Filed: Aug. 26, 2016

(86) PCT No.: PCT/CN2016/096819
§ 371 (c)(1),
(2) Date: Jan. 15, 2018

(87) PCT Pub. No.: WO2017/036350
PCT Pub. Date: Mar. 9, 2017

(65) Prior Publication Data
US 2018/0241074 A1    Aug. 23, 2018

(30) Foreign Application Priority Data

Aug. 28, 2015 (CN) .......................... 2015 1 0537227

(51) Int. Cl.
*H01M 10/0525* (2010.01)
*H01M 4/62* (2006.01)
*H01M 4/587* (2010.01)
*H01M 4/1393* (2010.01)
*H01M 4/133* (2010.01)
*H01M 4/36* (2006.01)
*H01M 4/04* (2006.01)
*H01M 4/583* (2010.01)
*H01M 4/02* (2006.01)

(52) U.S. Cl.
CPC .......... *H01M 10/0525* (2013.01); *H01M 4/04* (2013.01); *H01M 4/133* (2013.01); *H01M 4/1393* (2013.01); *H01M 4/364* (2013.01); *H01M 4/587* (2013.01); *H01M 4/5835* (2013.01); *H01M 4/625* (2013.01); *H01M 2004/027* (2013.01); *H01M 2004/028* (2013.01)

(58) Field of Classification Search
CPC ... H01M 4/04; H01M 4/5835; H01M 10/0525
USPC ...................................................... 429/231.8
See application file for complete search history.

(56) References Cited

U.S. PATENT DOCUMENTS

| | | |
|---|---|---|
| 2013/0224603 A1 | 8/2013 | Chen et al. |
| 2016/0036048 A1* | 2/2016 | Naito .................... H01M 4/366 |
| | | 429/231.1 |

FOREIGN PATENT DOCUMENTS

CN          104868106 A        8/2015

OTHER PUBLICATIONS

Guanghui et al., N-doped graphene/graphite composite as a conductive agent-free anode material for lithium ion batteries with greatly enhanced electrochemical performance, May 2015, Electrochimica Acta, 171, 156-164 (Year: 2015).*
Zhang et al., Graphite/graphene oxide composite as high capacity and binder-free anode material for lithium ion batteries, May 2013, Journal of Power Sources, 214, 619-626 (Year: 2013).*
Gong et al., Functionalized-Graphene Composites: Fabrication and Applications in Sustainable Energy and Environment, Oct. 2016, Chemistry of Materials, 28, 8082-8118. (Year: 2016).*

* cited by examiner

*Primary Examiner* — Sean P Cullen
(74) *Attorney, Agent, or Firm* — Bayramoglu Law Offices LLC

(57) ABSTRACT

A lithium ion battery anode material, a method thereof and a lithium ion battery. The lithium ion battery anode material includes graphite carbon materials and functionalized graphene. The method of the lithium ion battery anode material includes the following steps: compounding a graphite phase carbon material and functionalized graphene by liquid phase compounding method or solid phase compounding method, to obtain a lithium ion battery composite material. The lithium ion battery anode material provided by the present invention has the advantages of high capacity, high initial coulombic efficiency, excellent cycle performance and low production cost.

18 Claims, No Drawings

ANODE MATERIAL INCLUDING GRAPHITE PHASE CARBON MATERIAL AND FUNCTIONALIZED GRAPHENE, METHOD THEREOF, AND LITHIUM ION BATTERY

CROSS-REFERENCE TO THE RELATED APPLICATIONS

This application is the national phase entry of International Application no. PCT/CN2016/096819 filed on Aug. 26, 2016, which claims the benefit of priority from a Chinese patent application no. 201510537227.4 filed on Aug. 28, 2015, titled "The lithium ion battery anode material, the method thereof and lithium ion battery". All contents of which are incorporated in the present application by reference.

TECHNICAL FIELD

The present disclosure relates to the field of energy storage materials, and in particular, to a lithium ion battery anode material, a preparation method thereof and a lithium ion battery

BACKGROUND

Lithium ion battery is a secondary battery, which is widely used in mobile phones, laptops, tablets and other devices. Lithium ion battery mainly relies on the movements of the lithium ions between the positive pole and the negative pole to work. Lithium ion battery is mainly composed of three parts: positive electrode, negative electrode and electrolyte. The performance of the negative electrode material has a significant impact on the performance of lithium ion batteries, the improvement in performance of the negative electrode materials also attracts much attention of people.

Currently, lithium ion battery anode material is mainly graphite material, including artificial graphite and natural graphite. Artificial graphite is mostly prepared by the high-temperature graphitization. If necessary, the properties of the artificial graphite are changed by coating modification to improve the performance of the artificial graphite. Natural graphite includes flake graphite or earthy graphite. However, the electrical properties of artificial graphite or natural graphite still need to be improved, the electrical properties seriously restrict the application and development of lithium ion batteries.

SUMMARY OF THE INVENTION

The present disclosure provides a lithium ion battery anode material with excellent electrical properties, the preparation method thereof and a lithium ion battery.

In one aspect, the present disclosure provides a preparation method for the lithium ion battery anode materials, including: compounding a graphite phase carbon material and functionalized graphene by liquid phase compounding method or solid phase compounding method to obtain a lithium ion battery composite material.

Further, compounding the graphite phase carbon material and the functionalized graphene by the liquid phase compounding method includes the following steps: S1, dispersing the functionalized graphene in a solvent to obtain a first dispersion; S2, adding a graphite phase carbon material into the first dispersion to obtain a second dispersion; S3, drying the second dispersion to obtain an anode material for a lithium ion battery.

Furthermore, the solvent is one or more of water, tetrahydrofuran, N,N-dimethylformamide, N-methylpyrrolidone, dichloromethane, ethanol and n-hexane.

Further, the concentration of the functionalized graphene in the first dispersion is 0.5 wt % to 5 wt %.

Further, the dispersion in step S1 is ultrasonic dispersion, and the dispersion time is 0.5 h-8 h.

Further, before the step S1, the method further includes a step of drying the graphite phase carbon material and/or the functionalized graphene to constant weight.

Further, the step S2 specifically includes: S2a, Adding a graphite phase carbon material into the first dispersion and stirring, then performing a low-energy can grinding to obtain a second dispersion; or S21, Adding the first graphite phase carbon material to the first dispersion and stirring; S22, adding a second graphite phase carbon material to the first dispersion and then performing a low-energy can grinding to obtain a second dispersion; the particle diameter of the first graphite phase carbon material is not greater than particle diameter of the second graphite carbon material.

Furthermore, the method for compounding a graphite phase carbon material and a functionalized graphene by a solid phase compounding method includes the following steps: mixing the graphite phase carbon materials and the functionalized graphene to get a dry-powder-mixture; performing low-energy can grinding to the dry-powder-mixture to obtain a lithium ion battery anode material.

The present disclosure also provides a lithium ion battery anode material, comprising: a graphite phase carbon material and functionalized graphene.

Further, the functionalized graphene includes one or more of aminated graphene, carboxylated graphene, hydroxylated graphene, thiolated graphene, graphene oxide, methylated graphene, trifluoromethylated graphene, octadecylated graphene, fluorinated graphene and graphene iodide; and/or the graphite phase carbon material includes one or more of artificial graphite, natural graphite, graphitized mesocarbon microbeads, graphitized carbon nanotubes.

Further, the mass percentage of the functionalized graphene is 0.01%-99%.

Further, the mass percentage of the functionalized graphene is 0.1%-10%, 45%-65% or 90%-99%.

Further, the particle diameter of the graphite phase carbon material is 20 µm to 45 µm, the particle diameter of the functionalized graphene is 10 µm to 20 µm; alternatively, the particle diameter of the graphite phase carbon material is 10 µm to 20 µm, the particle diameter of the functionalized graphene is 20 um~30 um.

In another aspect, the present disclosure further provides a lithium ion battery, the negative electrode of which includes the lithium ion battery anode material described in any one of the above.

The present disclosure provides a lithium ion battery anode material and a preparation method thereof. The lithium ion battery anode material includes a graphite phase carbon material and functionalized graphene. The material is prepared by compounding a graphite phase carbon material with functionalized graphene to obtain a composite material which conducted to an anode material. In the anode material provided by the present disclosure, the functional groups on the functionalized graphene have high ability to capture lithium ions, for example, the amino group of the aminated graphene, the carboxyl group of the carboxylated graphene, the hydroxyl group of the hydroxylated graphene, all of them can capture lithium ions. Therefore, the functionalized graphene has a high capacity. However, functionalized graphene is more expensive and has poor if used individually as an anode material. Although the graphite phase carbon materials used in combination with functionalized graphene have lower capacity, but they have higher initial coulombic efficiencies and lower cost. Besides, the graphite phase carbon materials and the functionalized graphene belong to carbon materials and are relatively easy to be compounded. Therefore, the anode materials formed by compounding the graphite phase carbon materials and the functionalized graphene, have both the high capacity of the functionalized graphene and high initial coulombic efficiency of the graphite phase carbon materials, exhibiting high cycle performance; and are easier to be compounded and the manufacturing cost is lower. Therefore, the anode materials for lithium ion batteries provided by the present disclosure have the advantages of high capacity, high initial coulombic efficiency, excellent cycle performance and low manufacturing cost. The experiment proves that the anode materials of the lithium ion batteries provided by the invention can help to improve the specific capacity and the initial coulombic efficiency of the batteries. The initial capacity can reach as high as 1500 mAh/g, the initial coulombic efficiency can reach 95%, and the capacity can be maintained at 80%-99% after 300 cycles.

DETAILED DESCRIPTION OF THE INVENTION

It should be noted that, under the condition that no conflict exists, the embodiments in the present invention and the features in the embodiments may be combined with each other. The present invention will be described in detail below with reference to the accompanying drawings and embodiments.

The present invention provides a lithium ion battery anode material comprising a graphite phase carbon material and functionalized graphene.

The graphite phase carbon materials according to the present invention refers to a carbon material partially or entirely composed of honeycomb lattices composed of carbon atoms. Graphite phase carbon materials include but are not limited to one or more of the following materials: artificial graphite, natural graphite, graphitized mesocarbon microbeads, and graphitized carbon nanotubes. The natural graphite may specifically be natural flake graphite or earthy graphite.

Compared with the existing anode materials, the present application innovatively compounds the graphite phase carbon materials and the functionalized graphene as the anode material of the lithium ion batteries. The traditional view considers that functionalized graphene is not suitable as a lithium ion battery anode material, mainly due to the low conductivity. However, the inventor of the present application has found that the main reason that affects the application of the existing anode materials to the lithium ion battery is not the conductivity, but the low capacity and the low initial coulombic efficiency. This is because the conductivity can be improved by adding a conductive additive, but the improvement of the capacity and the initial coulombic efficiency can hardly be achieved by simply adding some additives.

Based on the concept, the present invention compounds the graphite phase carbon materials with the functionalized graphene to obtain composite materials of graphite phase carbon materials and functionalized graphene as anode materials. The reason for choosing the above two materials is:

In one aspect, the functional groups on the functionalized graphene have a high ability to capture lithium ions, for example, the amino group of the aminated graphene, the carboxyl group of the carboxylated graphene, the hydroxyl group of the hydroxylated graphene, the thiol group of the thiolated graphene, the carboxyl group and the hydroxyl group of graphene oxide, etc. All of them can capture lithium ions. Therefore, the functionalized graphene has a high capacity. However, the functionalized graphene is more expensive and has poor individuality as anode materials.

On the other hand, although the capacity of graphite phase carbon materials is low, they have higher initial coulombic efficiency and lower cost. Besides, the functionalized graphene and the graphite phase carbon materials both belong to carbon materials and it is relatively easy to achieve compounding. Therefore, the anode materials formed by compounding the graphite phase carbon materials and the functionalized graphene, have both the high capacity of the functionalized graphene and high initial coulombic efficiency of the graphite phase carbon materials, exhibit excellent cycle performance; are easier to be compounded and the manufacturing cost of is low. In summary, the anode materials for lithium ion batteries provided by the present invention have the advantages of high capacity, high initial coulombic efficiency, excellent cycle performance and lower manufacturing cost.

The functionalized graphene may be one or more of aminated graphene, carboxylated graphene, hydroxylated graphene, thiolated graphene, graphene oxide, methylated graphene, trifluoromethylated graphene, octadecylated graphene, fluorinated graphene and graphene iodide. Preferred is one or more of thiolated graphene, hydroxylated graphene, fluorinated graphene, graphene oxide and carboxylated graphene. The graphite phase carbon material is preferably one or more of artificial graphite, graphitized mesocarbon microbeads and graphitized carbon nanotubes.

In the lithium ion battery anode materials provided by the present invention, the mass percentage of the functionalized graphene may be 0.01%-99%, preferably 0.1%-10%, 45%-65%, or 90%-99%.

Moreover, the inventor considered increasing the bulk density of the two raw materials to further improve the electrical properties of the materials, especially the capacity. Hereby, the present invention further optimizes the bulk density of the two raw materials of the composite material by selecting the combinations of the graphite phase carbon materials and the functionalized graphene with different particle diameters. For the case that the particle diameter of the graphite phase carbon material is larger than that of the functionalized graphene, the particle diameter of the graphite phase carbon material in the above anode material is preferably 20 μm to 45 μm, and the particle diameter of the functionalized graphene is 10 μm to 20 μm. For the case that the particle diameter of the carbon material is smaller than that of the functionalized graphene, the particle diameter of the graphite phase carbon material is preferably 10 μm to 20 μm, and the particle diameter of the functionalized graphene is preferably 20 μm to 30 μm.

Moreover, for the case that the particle diameter of the graphite phase carbon material is larger than that of the functionalized graphene, by selecting the raw materials with the sizes divided into three stages or multiple stages, benefits the compactness of the gap filling between the raw materials. Accordingly, the graphite phase carbon materials include: a first graphite phase carbon material with a particle diameter of 20 μm to 30 μm and a second graphite phase carbon material with a diameter of 30 μm to 45 μm. The first graphite phase carbon material and the second graphite phase carbon material may be the same or different. Preferably, the first graphite phase carbon material is graphite phase mesocarbon microbeads or graphitized carbon nanotubes; and the second graphite phase carbon material is artificial graphite or natural graphite.

The lithium ion battery anode material provided by the present disclosure comprises a graphite phase carbon material and a functionalized graphene. The functionalized graphene has higher ability to capture lithium ions and high capacity; graphite phase carbon material has a high initial coulombic efficiency and low cost. Besides, the graphite phase carbon material and the functionalized graphene both belong to carbon materials and are relatively easier to be compounded. Therefore, the anode materials formed by compounding the graphite phase carbon materials and the functionalized graphene, which have both the high capacity of the functionalized graphene and the high initial coulombic efficiency of the graphite phase carbon materials, exhibit high cycle time performance; are easier to achieve compounding and the manufacturing cost is low. In summary, the anode material for lithium ion batteries provided by the present invention has the advantages of high capacity, high initial coulombic efficiency, excellent cycle performance and lower production cost.

Correspondingly, the present invention also provides a lithium ion battery, wherein the negative electrode of the lithium ion battery includes the above lithium ion battery anode materials. Due to the advantages of the lithium ion anode materials described above, the lithium ion battery with the lithium ion anode material has the advantages of high capacity, high initial coulombic efficiency, excellent cycle performance and low manufacturing cost.

The present invention further provides a preparation method of the above lithium ion battery anode material, which comprises:

compounding the graphite phase carbon material and the functionalized graphene by the liquid phase compounding method or the solid phase compounding method to obtain the lithium ion battery composite material.

Because the liquid phase compounding method has the advantages of simple operation, the present invention preferably adopts the liquid phase compounding method to prepare the anode materials. Specifically, the following steps are included:

S1, dispersing functionalized graphene in a solvent to obtain a first dispersion;

S2, adding graphite phase carbon materials to the first dispersion and uniformly mixing to obtain a second dispersion;

S3, drying the second dispersion to obtain lithium ion battery anode materials.

The inventors of the present application have found that the uniformity of dispersion of the functionalized graphene has an important influence on the consistency and cycle performance of the anode materials. In order to ensure the uniformity of the dispersion of the functionalized graphene, the present disclosure disperses the functionalized graphene first and then adds the graphite phase carbon materials. This is because, if the functionalized graphene is added first, it is easy to cause the undispersed functionalized graphene to be adsorbed on the graphite surface, which increases the difficulty of uniformly dispersing the graphene.

In order to further improve the uniformity of the dispersion of the functionalized graphene, ultrasonic dispersion is preferably performed in the above Step S1. Although, the longer the ultrasonic dispersion, the more beneficial it is to improve the uniformity of the dispersion of the functionalized graphene; the present inventors also found that the longer time for the ultrasonic dispersion is not better. It is because, if the ultrasonic dispersion time is too long, the excessive layers of functionalized graphene would be broken, increasing the defect density; and the size of the functionalized graphene is reduced at the same time, adversely affecting cycle performance. Accordingly, the time for ultrasonic dispersion is preferably 0.5 h to 8 h, and more preferably 1 h to 3 h.

In addition, the ratio of functionalized graphene to solvent also affects the dispersion uniformity of the functionalized graphene. If the proportion is too low, i.e. the concentration of the functionalized graphene in the first dispersion is too low, it will result in the waste of the solvent and meanwhile the difficulty in the subsequent drying process; if the proportion is too high, i.e. the concentration of the functionalized graphite in the first dispersion concentration is too high, graphene will get prone to agglomeration. The concentration of the functionalized graphene in the first dispersion in the present invention is preferably 0.5 wt % to 5 wt %, more preferably 2 wt % to 3.5 wt %.

The solvent may be one or more of water, tetrahydrofuran, N,N-dimethylformamide, N-methylpyrrolidone, dichloromethane, ethanol and n-hexane. Preferably one or more of water, N-methylpyrrolidone, N,N-dimethylformamide. More preferably water and N,N-dimethylformamide in a volume ratio of (0.8 to 2):1. Such a solvent has good dispersibility on both the functionalized graphene and the graphite phase carbon materials and is beneficial for obtaining anode materials with high consistency.

Step S2 is a liquid phase compounding process. Specifically, the graphite phase carbon material is added to the first dispersion prepared in Step S1 to be uniformly mixed. The mixing process in this step can be achieved by high-speed stirring. Step S1 specifically includes, adding graphite phase carbon materials to the first dispersion to perform high-speed stirring for 0.5 h to 8 h. The stirring speed may be 300 rpm~800 rpm.

In the liquid phase compounding process, the compaction of the two materials influences the performance of the product, especially the capacity and the initial coulombic efficiency. In order to increase the compactness of the two composites, step S2 preferably comprises:

S2a, adding the graphite phase carbon material into the first dispersion and stirring, then performing low-energy can grinding to obtain the second dispersion.

In this step, the low-energy can grinding is performed after being stirred. On one hand, the low-energy can grinding enables the graphite phase carbon materials and the functionalized graphene fully contact and collide in the system, thereby effectively promoting the recombination of the two materials; on the other hand, because of the lower energy, the structure of functionalized graphene and functional groups would not be damaged. The rotation speed of the low-energy can grinding is preferably 30 rpm to 200 rpm. The time of low-energy can grinding can be 5 min~180 min.

As another preferred solution of the present invention, step S2 may further specifically include the following steps:

S21, adding the first graphite phase carbon material to the first dispersion and stirring;

S22, adding second graphite phase carbon materials and performing low-energy can grinding to obtain a second dispersion; the particle diameter of the first graphite phase carbon material is not greater than the particle diameter of the second graphite phase carbon material.

The first graphite phase carbon material and the second graphite phase carbon material may be the same or different. Preferably, the first graphite phase carbon material may be graphitized mesocarbon microbeads or graphitized carbon nanotubes, and the second graphite phase carbon material may be artificial graphite or natural graphite.

The first graphite phase carbon material and the second graphite phase carbon material may have the same particle diameter, and the particle diameter of the first graphite phase carbon material may be smaller than the particle diameter of the second graphite phase carbon material as well. Preferably the latter, adding small-diameter graphite phase carbon materials for stirring at first, which is conducive to achieving uniform dispersion of the first graphite phase carbon materials; after that adding large-diameter graphite phase carbon materials for can grinding. On the one hand, it is conducive to the uniformity of dispersion of the second graphite phase carbon materials, on the other hand it is conducive to the sufficient contact and impact among the second graphite phase carbon materials, the first graphite phase carbon materials and the functionalized graphene, so as to increase the bulk density of the materials. Therefore, this method has the advantage of obtaining anode materials with uniform distribution and high bulk density.

The first graphite phase carbon material preferably has a particle diameter of 20 μm to 30 μm. The second graphite phase carbon material preferably has a particle diameter of 30 μm to 45 μm. The sieving of the graphite phase carbon materials with different particle diameters can be achieved by sieving through a sieve with predetermined number, also can be achieved by dispersing the graphite phase carbon material into a solvent and passing through a filtration film with a predetermined filtration diameter.

Step S3 is a process of obtaining the graphite phase carbon material/functionalized graphene composite materials by drying the second dispersion. Drying method may specifically be spray drying, vacuum drying, boiling drying, flash drying or freeze drying. Drying temperature can be 50° C.~150° C., drying time can be 8 h~72 h. After being dried, the obtained product may also be crushed and sieved to obtain a certain size of anode materials.

The anode material provided by the present invention comprises graphite phase carbon materials and functionalized graphene. The ratio of the two materials has an influence on the electrical properties of the anode material. However, since both materials have a certain degree of water absorption, to avoid the influences on the electrical properties of the anode materials, caused by the ratio error between raw materials due to the water content of the materials, it preferably includes a step to dry the graphite phase carbon materials and the functionalized graphene to a constant weight before S1. The drying temperature in this step can be 60° C.~100° C., and the drying time can be 8 h~72 h.

The solid phase compounding method can also be used for preparing the lithium ion anode materials above, and specifically includes the following steps:

mixing the graphite carbon materials and functionalized graphene together to get a dry-powder mixture;

The mixed graphite phase carbon materials and the functionalized graphene are subjected to low-energy can grinding to obtain the anode materials of the lithium ion batteries.

The rotation speed of the low-energy can grinding is preferably 30 rpm to 200 rpm. The time of low-energy can grinding is 5 min~180 min. In addition, the proportions of the graphite phase carbon material and the functionalized graphene, the specific choice of the graphite phase carbon material, the specific choice of the functionalized graphene, and the particle diameters of them may be the same as the embodiments listed above and will not be described in detail herein.

Another embodiment of the present invention further provides a lithium ion battery, wherein the negative electrode includes the lithium ion battery anode materials. Specifically, the lithium ion battery may include an anode, an electrolyte, and a negative electrode. The negative electrode may include the above lithium ion battery anode material. In addition, the negative electrode may further include a conductive additive such as acetylene black and a binder. The above anode and electrolyte can be the same as the existing lithium ion batteries. The content of the conductive additive in the negative electrode may be 5 wt % to 20 wt %, preferably 10 wt % to 20 wt %.

Due to the advantages of the lithium ion anode materials described above, the lithium ion battery consisting of the lithium ion battery anode material has the advantages of high capacity, high initial coulombic efficiency, excellent cycle performance and low production cost The solution of the present invention is further described below with reference to the specific embodiments.

Embodiment 1

1, Dry the artificial graphite powder and thiolated graphene powder at 60° C. under vacuum for 24 hours to a constant weight, and set aside.

2, Disperse the dried thiolated graphene in N-methylpyrrolidone (NMP) and ultrasonic dispersion for 0.5 h, then obtain a first dispersion with concentration of 0.5 wt % of thiolated graphene.

3, Add the dried artificial graphite into the first dispersion, the weight ratio of artificial graphite to thiol graphene is 99.9:0.1; perform high-speed stirring for 0.5 h, the stirring speed is 300 rpm, to obtain a second dispersion.

4, The second dispersion was dried at 150° C. under vacuum for 24 h to obtain a thiolated graphene-artificial graphite composite material, then crush and sieve the material and mark it as sample 1.

Embodiment 2

1, Dry the graphitized mesocarbon microbeads and fluorinated graphene powder at 80° C. under vacuum for 36 hours to a constant weight, and set aside.

2, Disperse the dried fluorinated graphene in water, ultrasonic dispersion for 1 h, to obtain a first dispersion with concentration of 2 wt % of fluorinated graphene.

3, Add the dried graphitized mesocarbon microbeads into the first dispersion, the weight ratio of the graphitized mesocarbon microbeads to the fluorinated graphene is 90:10; conduct high-speed stirring for 1 h, the stirring speed is 500 rpm, to obtain a second dispersion.

4, Dry the second dispersion under vacuum at 50° C. for 72 h to obtain a fluorinated graphene-graphitized carbon microsphere composite material, then crush and sieve the material and mark it as sample 2.

Embodiment 3

1, Dry the graphitized carbon nanotubes and hydroxylated graphene powder under vacuum at 100° C. for 72 hours to a constant weight, and set aside.

2, Disperse the dried hydroxylated graphene in N,N-dimethylformamide, ultrasonic dispersion for 3 h, to obtain a first dispersion with concentration of 5 wt % of hydroxylated graphene.

3, Add dried graphitized carbon nanotubes into the first dispersion, the weight ratio of graphite carbon nanotubes to hydroxylated graphene is 55:45; conduct high-speed stirring for 8 h, the stirring speed is 480 rpm, to obtain a second dispersion.

4, Dry the second dispersion through boiling drying at 150° C. for 8 h to obtain a hydroxylated graphene-graphitized carbon nanotubes composite material, then crush and sieve the material and mark it as sample 3.

Embodiment 4

1, Dry the artificial graphite and graphene oxide powder under vacuum at 80° C. for 24 hours to a constant weight, and set aside.

2, Disperse the dried graphene oxide in a mixed solvent which the volume ratio of water to N,N-dimethylformamide is 0.8:1, and ultrasonic dispersion for 3 h to obtain a first dispersion with concentration of 3.5 wt % of graphene oxide.

3, Add the dried artificial graphite to the first dispersion, the weight ratio of artificial graphite to graphene is 35:65; conduct high-speed stirring for 6 h, the stirring speed is 800 rpm, to obtain a second dispersion.

4, Dry the second dispersion under vacuum 100° C. for 24 h to obtain a graphene oxide-artificial graphite composite material, then crush and sieve the material and mark it as sample 4.

Embodiment 5

1, Dry the natural flake graphite and carboxylated graphene powder under vacuum at 100° C. for 12 hours to a constant weight, and set aside.

2, Disperse the dried carboxylated graphene in a mixed solvent which the volume ratio of water to N,N-dimethylformamide is 2:1, the time for ultrasonic dispersion is 2 h, to obtain a first dispersion with concentration of 3 wt % of carboxylated graphene.

3, Add the dried natural flake graphite to the first dispersion, the weight ratio of natural flake graphite to carboxylated graphene is 10:90; conduct high-speed stirring for 4 h, the stirring speed is 750 rpm, to obtain a second dispersion.

4, Dry the second dispersion under vacuum at 120° C. for 24 h to obtain a carboxylated graphene-natural flake graphite composite material, then crush and sieve the material and mark it as sample 5.

Embodiment 6

1, Dry the earthy graphite and aminated graphene powder under vacuum at 80° C. for 48 hours to a constant weight, and set aside.

2, Disperse the dried aminated graphene in tetrahydrofuran, ultrasonic dispersion for 8 h, to obtain a first dispersion with concentration of 1 wt % of aminated graphene.

3, Add the dried earthy graphite to the first dispersion, the weight ratio of earthy graphite to aminated graphene is 1:99; conduct high-speed stirring for 2 h, the stirring speed is 600 rpm, to obtain a second dispersion.

4. Dry the second dispersion under vacuum at 100° C. for 24 h to obtain aminated graphene-earthy graphite composite material, then crush and sieve the material and mark it as sample 6.

Embodiment 7

1, Dry the artificial graphite and methylated graphene powder under vacuum at 100° C. for 24 hours to a constant weight, and set aside.

2, Disperse the dried methylated graphene in dichloromethane, ultrasonic dispersion for 6 h, to obtain a first dispersion concentration of 4 wt % of methylated graphene.

3, Add the dried artificial graphite to the first dispersion, the weight ratio of artificial graphite to methylated graphene is 70:30; conduct high-speed stirring for 4 h, the stirring speed is 600 rpm, to obtain a second dispersion.

4. Dry the second dispersion under vacuum at 120° C. for 24 h to obtain a methylated graphene-artificial graphite composite material, then crush and sieve the material and mark it as sample 7.

Embodiment 8

1, Dry the graphitized carbon nanotubes and graphene iodide powder at 60° C. under vacuum 36 hours to a constant weight, and set aside.

2, Disperse the dried graphene iodide in ethanol, ultrasonic dispersion for 7 h, to obtain a first dispersion of graphene iodide with concentration of 2.5 wt %.

3, Add the dried graphite carbon nanotubes to the first dispersion, the weight ratio of graphitized carbon nanotubes to graphene iodide is 20:80; conduct high-speed stirring for 8 h, the stirring speed is 300 rpm, to obtain a second dispersion.

4. Dry the second dispersion under vacuum at 100° C. for 24 h to obtain a graphene iodide-graphitized carbon nanotubes composite material, then crush and sieve the material and mark it as sample 8.

Embodiment 9

1, Dry the natural flake graphite, trifluoromethylated graphene and octadecylated graphene powder under vacuum at 80° C. for 10 hours to a constant weight, and set aside.

2, Disperse the dried trifluoromethylated graphene and octadecylated graphene in n-hexane, ultrasonic dispersion for 7 h, the weight ratio of trifluoromethylated graphene to octadecylated graphene is 1:1; to obtain a first dispersion of functionalized graphene (including trifluoromethylated graphene and octadecylated graphene) with a concentration of 3 wt %.

3, Add the dried natural flake graphite to the first dispersion, the weight ratio of natural flake graphite to functionalized graphene is 80:20; high-speed stirring for 8 h, the stirring speed is 680 rpm, to obtain a second dispersion.

4. Dry the second dispersion under vacuum at 100° C. for 24 h to obtain a trifluoromethylated graphene-octadecylated graphene-natural flake graphite composite material, then crush and sieve the material and mark it as sample 9.

Embodiment 10

1, Sieve the graphitized mesocarbon microbeads through a 1340-mesh sieve to obtain graphitized mesocarbon microbeads with the particle diameter of 10 μm; disperse the fluorinated graphene into water, and then perform suction filtration through a 20 µm membrane filter and get dried;

2, Dry the sieved graphitized mesocarbon microbeads and filtered fluorinated graphene under vacuum at 80° C. for 36 hours to a constant weight, and set aside.

3, Disperse the dried fluorinated graphene dispersed into water, ultrasonic dispersion for 1 h, to obtain a first dispersion with a concentration of 2 wt % of the first dispersion of fluorinated graphene.

4, Add the dried graphitized mesocarbon microbeads in the first dispersion, the weight ratio of graphitized mesocarbon microbeads to fluorinated graphene is 90:10; conduct high-speed stirring for 11 h, the stirring speed is 750 rpm; conduct low-energy can grinding for 5 min, the can grinding rotation rate is 200 rpm, to obtain a second dispersion.

5. Dry the second dispersion under vacuum at 50° C. for 72 h, to obtain a fluorinated graphene-graphitized mesocarbon microbeads composite material, then crush and sieve the material and mark it as sample 10.

Embodiment 11

1, Sieve the graphitized mesocarbon microbeads through a 635-mesh sieve to obtain graphitized mesocarbon microbeads with a particle diameter of 20 µm; disperse fluorinated graphene into water, and then perform suction filtration through a 30 µm filter and get dried;

2, Dry the sieved graphitized mesocarbon microbeads and filtered fluorinated graphene under vacuum at 80° C. for 36 hours to a constant weight, and set aside.

3, Disperse the dried fluorinated graphene into water, ultrasonic dispersion for 1 h, to obtain a first dispersion of fluorinated graphene with concentration of 2 wt %.

4, Add the dried graphitized mesocarbon microbeads to the first dispersion, the weight ratio of graphitized mesocarbon microbeads to graphene fluoride is 90:10; high-speed stirring for 11 h, the stirring speed is 750 rpm; then low-energy can-grind for 5 min, the can-grind rotation rate is 200 rpm, to obtain a second dispersion.

5. Dry the second dispersion under vacuum at 50° C. for 72 h to obtain a fluorinated graphene-graphitized mesocarbon microbeads composite material, then crush and sieve the material and mark it as sample 11.

Embodiment 12

1, Sieve the artificial graphite through a 635-mesh sieve to obtain a first artificial graphite with a particle diameter of 20 µm. Sieve the artificial graphite through (450) mesh sieve to obtain a second artificial graphite with a particle diameter of 30 µm. Disperse the graphene oxide into water, and then perform suction filtration through a 10 µm membrane filter and get dried.

2, Dry the sieved artificial graphite and filtered graphene oxide powder under vacuum at 80° C. for 24 hours to a constant weight, and set aside.

3, Disperse the dried graphene oxide in a mixed solvent which the volume ratio of water to N,N-dimethylformamide is 0.8:1, sonicate for 3 h, to obtain a first dispersion of graphene oxide with a concentration of 3.5 wt %.

4, Add the first artificial graphite which is partially dried to the first dispersion, conduct high-speed stirring for 6 h, the stirring speed is 300 rpm; then add a second artificial graphite and perform low-energy can grinding for 180 min, the low-energy can grinding speed is 30 rpm, to obtain a second dispersion; the weight ratio of the first artificial graphite to the second artificial graphite is 1:2; and the weight ratio of the artificial graphite to the graphene oxide is 35:65.

5. Dry the second dispersion under vacuum at 100° C. for 24 h, to obtain a graphene oxide-artificial graphite composite material, then crush and sieve the material and mark it as sample 12.

Embodiment 13

1, Disperse the graphitized carbon nanotubes into water, perform suction filtration through a 30 µm membrane filter; disperse the artificial graphite into water, perform suction filtration through a 45 µm membrane filter; disperse the carboxylated graphene into water, perform suction filtration through a 20 µm membrane filter.

2, Dry the filtered graphitized carbon nanotubes, artificial graphite and carboxylated graphene under vacuum at 100° C. for 12 hours to a constant weight, and set aside.

3, Disperse the dried carboxylated graphene in a mixed solvent which the volume ratio of water to N,N-dimethylformamide is 2:1, ultrasonic dispersion for 2 h, to obtain a dispersion of carboxylated graphene with a concentration of 3 wt %.

4, Add the dried graphitized carbon nanotubes in the first dispersion, conduct high-speed stirring for 4 h, the stirring speed is 600 rpm; then add the dried artificial graphite, perform low-energy can grinding for 60 min, the grinding speed is 100 rpm, to obtain a second dispersion. The weight ratio of graphitized carbon nanotubes to artificial graphite is 1:1. The weight ratio of graphite phase carbon materials (including artificial graphite and graphitized carbon nanotubes) to carboxylated graphene is 10:90.

5, Dry the second dispersion under vacuum at 120° C. for 24 h to obtain a carboxylated graphene-natural flake graphite-artificial graphite composite material, then crush and sieve the material and mark it as sample 13.

Embodiment 14

1, Dry the artificial graphite powder and the thiolated graphene powder under vacuum at 60° C. for 24 hours to a constant weight, and set aside.

2, Mix the prepared artificial graphite and thiol graphene, the weight ratio of the earthy graphite to the thiolated graphene is 99.9:0.1.

3, Perform low-energy can grinding on the mixture obtained in the step 2, wherein the rotating speed is 30 rpm for 180 min, to obtain a thiolated graphene-artificial graphite composite material, and mark it as sample 14.

Embodiment 15

1, Dry the earthy graphite and the aminated graphene powder at 80° C. under vacuum for 48 hours to a constant weight, and set aside.

2, Mix the prepared earthy graphite and aminated graphene, the weight ratio of earthy graphite to aminated graphene is 1:99.

3, Perform low-energy can grinding on the mixture obtained in the step 2, wherein the rotating speed is 200 rpm, the time for it is 5 minutes, to obtain aminated graphene-earthy graphite composite material; then crush and sieve the material and mark it as sample 15.

Embodiment 16

1, Sieve the graphitized mesocarbon microbeads through a 1340-mesh sieve to obtain graphitized mesocarbon microbeads with the particle diameter of 10 μm; disperse the fluorinated graphene in water, then conduct suction filtration through a 20 um membrane filter and get dried;

2, Dry the sieved graphitized mesocarbon microbeads and the filtered fluorinated graphene at 80° C. for 36 hours to a constant weight, and set aside.

3, Mix the prepared graphitized mesocarbon microbeads and fluorinated graphene, the weight ratio of the graphitized mesocarbon microbeads to the fluorinated graphene is 90:10.

4, Perform low-energy can grinding on the mixture obtained in the step 3, the time for grinding is 8 minutes, and the rotating speed is 200 rpm, to obtain a fluorinated graphene-graphitized mesocarbon microbeads composite material; then crush and sieve the material and mark it as sample 16.

Embodiment 17

1, Sieve the artificial graphite through a 635-mesh sieve to obtain a first artificial graphite with the particle diameter of 20 rm. Sieve the artificial graphite through a 450-mesh sieve, to obtain the second artificial graphite with the particle diameter of 30 μm. Disperse the graphene oxide into water, then perform suction filtration through a 10 μm membrane filter and get dried.

2, Dry the sieved artificial graphite and the filtered graphene oxide powder at 80° C. under vacuum for 24 hours to a constant weight, and set aside.

3, Mix the prepared first artificial graphite, second artificial graphite and graphene oxide, the weight ratio of them is 12:35:65.

4, Conduct low-energy can grinding to the mixture obtained in the step 3, wherein the time for grinding is 80 minutes, the rotating speed is 100 rpm, to obtain a graphene oxide-artificial graphite composite material, then crush and sieve the material and mark it as sample 17.

Embodiment 18

1, Disperse graphitized carbon nanotubes in water, then perform suction filtration through a 30 μm membrane filter and get dried; disperse the artificial graphite in water, then perform suction filtration through a 45 μm membrane filter; disperse carboxylated graphene into water, then perform suction filtration through a 20 μm membrane filter.

2, Dry the filtered graphitized carbon nanotubes, the artificial graphite and the carboxylated graphene under vacuum at of 100° C. for 12 hours to a constant weight, and set aside.

3, Mix the prepared graphitized carbon nanotubes, artificial graphite and carboxylated graphene, the weight ratio of them is 5:5:90.

4, Perform low-energy can grinding on the mixture obtained in the step 3, wherein the time for grinding is 60 minutes, and the rotating speed is 180 rpm, to obtain a carboxylated graphene-natural flake graphite-artificial graphite composite material, then crush and sieve the material and mark it as sample 18.

Reference 1

Dry the natural graphite powder under vacuum at 60° C. for 24 hours to obtain dried graphite powder, and mark it as a sample 0.

Assemble the samples 1 to 18 and the sample 0 into a button battery respectively and perform the test.

The assembling conditions are as follows: mix the materials according to the weight ratio of an active materials (i.e. the above sample):acetylene black:a binder is 80:10:10 to prepare an electrode sheet, take the lithium sheet as a positive electrode, and taking the Celellard2300 porous membrane as a diaphragm, wherein the mixed solution of LiPF6+DMC(volume ratio of 1:1 is 1 mol/l) is used as an electrolyte, assemble the button battery. Carry out the electrochemical property test by the Land BS9300 (Wuhan Jinnuo Electronics) which is a program-controlled full-automatic electrochemical tester.

The test results are listed in table 1:

TABLE 1

Electrical property test results of sample 0 to sample 18

| Sample Number | Initial coulombic efficiency | Initial Capacity (mAh/g) | Capacity after 300 Cycles (mAh/g) |
| --- | --- | --- | --- |
| 0 | 85% | 320 | 255 |
| 1 | 90% | 910 | 782 |
| 2 | 92% | 400 | 385 |
| 3 | 90% | 900 | 648 |
| 4 | 91% | 1200 | 965 |
| 5 | 90% | 780 | 663 |
| 6 | 95% | 506 | 471 |
| 7 | 90% | 470 | 446 |
| 8 | 91% | 495 | 396 |
| 9 | 90% | 450 | 436 |
| 10 | 95% | 458 | 448 |
| 11 | 94% | 450 | 441 |
| 12 | 93% | 1500 | 1258 |
| 13 | 92% | 945 | 784 |
| 14 | 90% | 833 | 667 |
| 15 | 90% | 493 | 443 |
| 16 | 90% | 418 | 402 |
| 17 | 91% | 863 | 750 |
| 18 | 90% | 594 | 532 |

It can be seen from the above list of results, compared with the existing lithium ion battery anode materials, the lithium ion battery anode material provided by the present invention helps to improve the specific capacity and the initial coulombic efficiency of the battery. The initial capacity is up to 1500 mAh/g, the initial coulombic efficiency up to 95%, the capacity after 300 cycles maintain 80% to 99%. The foregoing descriptions are merely preferred embodiments of the present invention, and should not be used to limit the present invention. Any modifications, equivalent substitutions, improvements, etc. made within the spirit and principle of the present invention should be included in the present invention within the scope of protection.

The invention claimed is:

1. A lithium ion battery anode material, comprising:
  a graphite phase carbon material and a functionalized graphene;
  wherein the functionalized graphene comprises one or more selected from the group consisting of carboxylated graphene, thiolated graphene, methylated graphene, trifluoromethylated graphene, octadecylated graphene, fluorinated graphene and graphene iodide; and
  the graphite phase carbon material comprises one or more selected from the group consisting of artificial graphite, natural graphite, graphitized mesocarbon microbeads, graphitized carbon nanotubes, wherein natural graphite is earthy graphite.

2. The lithium ion battery anode material according to claim 1, wherein a mass percentage of the functionalized graphene is 0.01% to 99%.

3. The lithium ion battery anode material according to claim 1, wherein a mass percentage of functionalized graphene is 0.1%-10%, 45%-65% or 90%-99%.

4. The lithium ion battery anode material according to claim 1, wherein the graphite phase carbon material has a particle size of 20 um to 45 um, the functionalized graphene has a particle size of 10 um to 20 um;
or,
the graphite phase carbon material has a particle size of 10 μm to 20 μm, the functionalized graphene has a particle size of 20 μm to 30 μm.

5. The lithium ion battery anode material according to claim 1, wherein the particle size of the graphite phase carbon material is larger than the particle size of the functionalized graphene, and the particle size of the graphite phase carbon material is divided into multiple phases wherein a first graphite carbon material with the particle diameter of 20 micrometer to 30 micrometer, and a second graphite phase carbon material with a diameter of 30 micrometer to 45 micrometer.

6. A lithium ion battery, comprising the lithium ion battery anode material of claim 1.

7. The lithium ion battery according to claim 6, wherein a mass percentage of the functionalized graphene is 0.01% to 99%.

8. The lithium ion battery according to claim 6, wherein a mass percentage of the functionalized graphene is 0.1%-10%, 45%-65% or 90%-99%.

9. The lithium ion battery according to claim 6, wherein the graphite phase carbon material has a particle size of 20 μm to 45 μm, the functionalized graphene has a particle size of 10 μm to 20 μm;
or,
the graphite phase carbon material has a particle size of 10 μm to 20 μm, the functionalized graphene has a particle size of 20 μm to 30 μm.

10. The lithium ion battery according to claim 6, wherein the particle size of the graphite phase carbon material is larger than the particle size of the functionalized graphene, and the particle size of the graphite phase carbon material is divided into multiple phases wherein a first graphite carbon material with the particle diameter of 20 micrometer to 30 micrometer, and a second graphite phase carbon material with a diameter of 30 micrometer to 45 micrometer.

11. A method for preparing a lithium ion battery anode material, comprising:
compounding a graphite phase carbon material and functionalized graphene by a liquid phase compounding method or a solid phase compounding method, to obtain a lithium ion battery composite material,
wherein the lithium ion battery anode material, comprising:
the graphite phase carbon material and the functionalized graphene;
wherein the functionalized graphene comprises one or more selected from the group consisting of carboxylated graphene, thiolated graphene, methylated graphene, trifluoromethylated graphene, octadecylated graphene, fluorinated graphene and graphene iodide; and
the graphite phase carbon material comprises one or more selected from the group consisting of artificial graphite, natural graphite, graphitized mesocarbon microbeads, graphitized carbon nanotubes, wherein natural graphite is earthy graphite.

12. The method according to claim 11, wherein compounding the graphite phase carbon material and the functionalized graphene is performed by the solid phase compounding method, and comprises the following steps:
mixing the graphite carbon material and functionalized graphene to get dry-powder-mixture;
grinding the dry-powder-mixture by low-energy can grinding at a rotation speed of 30 to 200 RPM for a time of 5 to 180 minutes to obtain the lithium ion battery anode material.

13. The method according to claim 11, wherein compounding the graphite phase carbon material and the functionalized graphene is performed by the liquid phase compounding method, and further comprises the following steps:
S1, dispersing the functionalized graphene in a solvent to obtain a first dispersion;
S2, adding the graphite phase carbon material to the first dispersion liquid and uniformly mixing, to obtain a second dispersion;
S3, drying the second dispersion to obtain the lithium ion battery anode material.

14. The method according to claim 13, further comprising a step of drying the graphite phase carbon material and/or the functionalized graphene to a constant weight before step S1.

15. The method according to claim 13, wherein the solvent is one or more selected from the group consisting of water, tetrahydrofuran, N,N-dimethylformamide, N-methylpyrrolidone, dichloromethane, ethanol and n-hexane.

16. The method according to claim 13, wherein a concentration of the functionalized graphene in the first dispersion is 0.5 wt % to 5 wt %.

17. The method according to claim 13, wherein the dispersion in step S1 is an ultrasonic dispersion and a time for the dispersion is 0.5 h-8 h.

18. The method according to claim 13, wherein the step S2 further comprises:
S2a, adding the graphite phase carbon material into the first dispersion and stirring, and then performing a low-energy can grinding at a rotation speed of 30 to 200 RPM for a time of 5 to 180 minutes to obtain the second dispersion;
or,
the graphite phase carbon material comprises a first graphite phase carbon material and a second graphite phase carbon material,
S21, adding the first graphite phase carbon material to the first dispersion and stirring;
S22, adding the second graphite phase carbon material to the first dispersion and then performing the low-energy can grinding at a rotation speed of 30 to 200 RPM for a time of 5 to 180 minutes to obtain the second dispersion; the particle size of the first graphite phase carbon material is not greater than the particle diameter of the second graphite phase carbon material.

* * * * *